(12) United States Patent
Miyake et al.

(10) Patent No.: US 12,280,788 B2
(45) Date of Patent: Apr. 22, 2025

(54) CONTROL APPARATUS, MANAGER, ELECTRONIC CONTROL UNIT, SYSTEM, CONTROL METHOD, NON-TRANSITORY COMPUTER-READABLE STORAGE MEDIUM STORING PROGRAM, AND VEHICLE

(71) Applicants: TOYOTA JIDOSHA KABUSHIKI KAISHA, Toyota (JP); ADVICS CO., LTD., Kariya (JP)

(72) Inventors: Kazuki Miyake, Okazaki (JP); Akitsugu Sakai, Toyota (JP); Shunsuke Arakawa, Miyoshi (JP); Yuma Mori, Tokyo (JP); Jun Aoki, Tokyo (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 411 days.

(21) Appl. No.: 17/712,463

(22) Filed: Apr. 4, 2022

(65) Prior Publication Data

US 2022/0315018 A1 Oct. 6, 2022

(30) Foreign Application Priority Data

Apr. 6, 2021 (JP) ................................. 2021-064757

(51) Int. Cl.
*B60W 50/00* (2006.01)
*B60W 60/00* (2020.01)

(52) U.S. Cl.
CPC ...... *B60W 50/0098* (2013.01); *B60W 60/001* (2020.02); *B60W 2510/1005* (2013.01); *B60W 2710/18* (2013.01)

(58) Field of Classification Search
None
See application file for complete search history.

(56) References Cited

U.S. PATENT DOCUMENTS

| 9,415,775 B2 * | 8/2016 | Sato | B60W 30/14 |
| 11,608,075 B2 * | 3/2023 | Suzuki | B60W 10/20 |
| 2017/0248959 A1 | 8/2017 | Matsubara et al. | |
| 2020/0070849 A1 * | 3/2020 | Suzuki | B60W 50/087 |
| 2021/0269000 A1 * | 9/2021 | Broyles | B60W 30/146 |
| 2022/0219711 A1 * | 7/2022 | Ohashi | B60W 60/001 |

FOREIGN PATENT DOCUMENTS

| CN | 110871788 A | 3/2020 |
| JP | 2017-154554 A | 9/2017 |
| JP | 2020-032894 A | 3/2020 |

* cited by examiner

*Primary Examiner* — Aniss Chad
*Assistant Examiner* — Jennifer M Anda
(74) *Attorney, Agent, or Firm* — Oliff PLC (57) ABSTRACT

A manager to be mounted on a vehicle includes a reception unit that receives a plurality of kinematic plans from a plurality of ADAS applications, an arbitration unit that performs arbitration of the kinematic plans, a calculation unit that calculates a motion request based on a result of the arbitration at the arbitration unit, and a distribution unit that distributes the motion request to at least one actuator system. The reception unit receives information related to arbitration targets of the arbitration unit from the ADAS applications.

7 Claims, 7 Drawing Sheets

CONTROL APPARATUS, MANAGER, ELECTRONIC CONTROL UNIT, SYSTEM, CONTROL METHOD, NON-TRANSITORY COMPUTER-READABLE STORAGE MEDIUM STORING PROGRAM, AND VEHICLE

CROSS-REFERENCE TO RELATED APPLICATION

This application claims priority to Japanese Patent Application No. 2021-064757 filed on Apr. 6, 2021, incorporated herein by reference in its entirety.

BACKGROUND

1. Technical Field

The present disclosure relates to a control apparatus, a manager, an electronic control unit, a system, a control method, a non-transitory computer-readable storage medium storing a program, and a vehicle.

2. Description of Related Art

In recent years, a plurality of advanced driver assistance system (ADAS) applications that implements autonomous driving functions for autonomous driving and automatic parking has been installed in vehicles. Japanese Unexamined Patent Application Publication No. 2020-032894 (JP 2020-032894 A) discloses a manager (control device) that receives requests output from these ADAS applications, arbitrates a plurality of requests received from the ADAS applications, and outputs a request for driving an actuator system (system including powertrain actuators, brake actuators, and so forth) based on a result of the arbitration.

SUMMARY

To control the vehicle most safely and securely, the manager may have a basic function for adopting a minimum request among a plurality of requests when the requests are received from a plurality of ADAS applications. In this basic function, however, when both an existing request that is about to terminate its output and a new request that is newly output are received from the ADAS applications, there is a possibility, depending on the result of arbitration, that the new request is not adopted until the existing request is terminated, thereby causing slowness in control (causing occupants to feel slowness).

The present disclosure has been made in view of the problem described above, and an object of the present disclosure is to provide, for example, a manager capable of reducing the occurrence of slowness in control.

An aspect of the present disclosure relates to a control apparatus to be mounted on a vehicle. The control apparatus includes one or more processors. The processor is configured to: receive a plurality of kinematic plans from a plurality of ADAS applications; perform arbitration of the kinematic plans; calculate a motion request based on an arbitration result related to the arbitration; distribute the motion request to at least one actuator system; and receive information related to an arbitration target in the arbitration from the ADAS applications.

An aspect of the present disclosure relates to a vehicle. The vehicle includes the control apparatus of the above aspect.

An aspect of the present disclosure relates to a manager to be mounted on a vehicle. The manager includes: a reception unit that receives a plurality of kinematic plans from a plurality of ADAS applications; an arbitration unit that performs arbitration of the kinematic plans; a calculation unit that calculates a motion request based on an arbitration result related to the arbitration; and a distribution unit that distributes the motion request to at least one actuator system, wherein the reception unit receives information related to an arbitration target in the arbitration from the ADAS applications.

An aspect of the present disclosure relates to an electronic control unit to be mounted on a vehicle and installed with one or more ADAS applications. The electronic control unit is configured to output, to a manager, kinematic plans of the one or more ADAS applications and information related to arbitration targets in an arbitration process for the kinematic plans.

An aspect of the present disclosure relates to a system that includes a plurality of ADAS applications installed in one or more electronic control units mounted on a vehicle and a manager. The one or more electronic control units are configured to output, to the manager, a plurality of kinematic plans requested by the ADAS applications. The manager is configured to: receive the kinematic plans from the ADAS applications; perform arbitration of the kinematic plans; calculate a motion request based on an arbitration result related to the arbitration; distribute the motion request to at least one actuator system; and receive information related to arbitration targets in the arbitration from the ADAS applications.

An aspect of the present disclosure relates to a control method to be executed by a computer of a manager mounted on a vehicle. The control method includes: receiving, from a plurality of ADAS applications, kinematic plans and information related to arbitration targets in an arbitration process for the kinematic plans; performing arbitration of the received kinematic plans; calculating a motion request based on a result of the arbitration; and distributing the motion request to at least one actuator system based on the information.

An aspect of the present disclosure relates to a non-transitory computer-readable storage medium storing a program. The program causes the manager, when executed by a computer of a manager mounted on a vehicle, to: receive, from a plurality of ADAS applications, kinematic plans and information related to arbitration targets in an arbitration process for the kinematic plans; perform arbitration of the received kinematic plans; calculate a motion request based on a result of the arbitration; and distribute the motion request to at least one actuator system based on the information.

According to the present disclosure, the existing request that is about to terminate its output is excluded from the arbitration target. Therefore, the new request can easily be adopted in the arbitration, thereby reducing the occurrence of slowness in control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In a manager according to the present disclosure, when a plurality of requests is made from applications in conflict and a plurality of kinematic plans includes a kinematic plan for which the request is scheduled to terminate, arbitration is performed while excluding the kinematic plan scheduled to terminate. Therefore, it is possible to avoid a case where no other kinematic plan request is adopted until termination of the kinematic plan request scheduled to terminate. An embodiment of the present disclosure will be described below in detail with reference to the drawings.

Embodiment

Configuration

Figure 1:
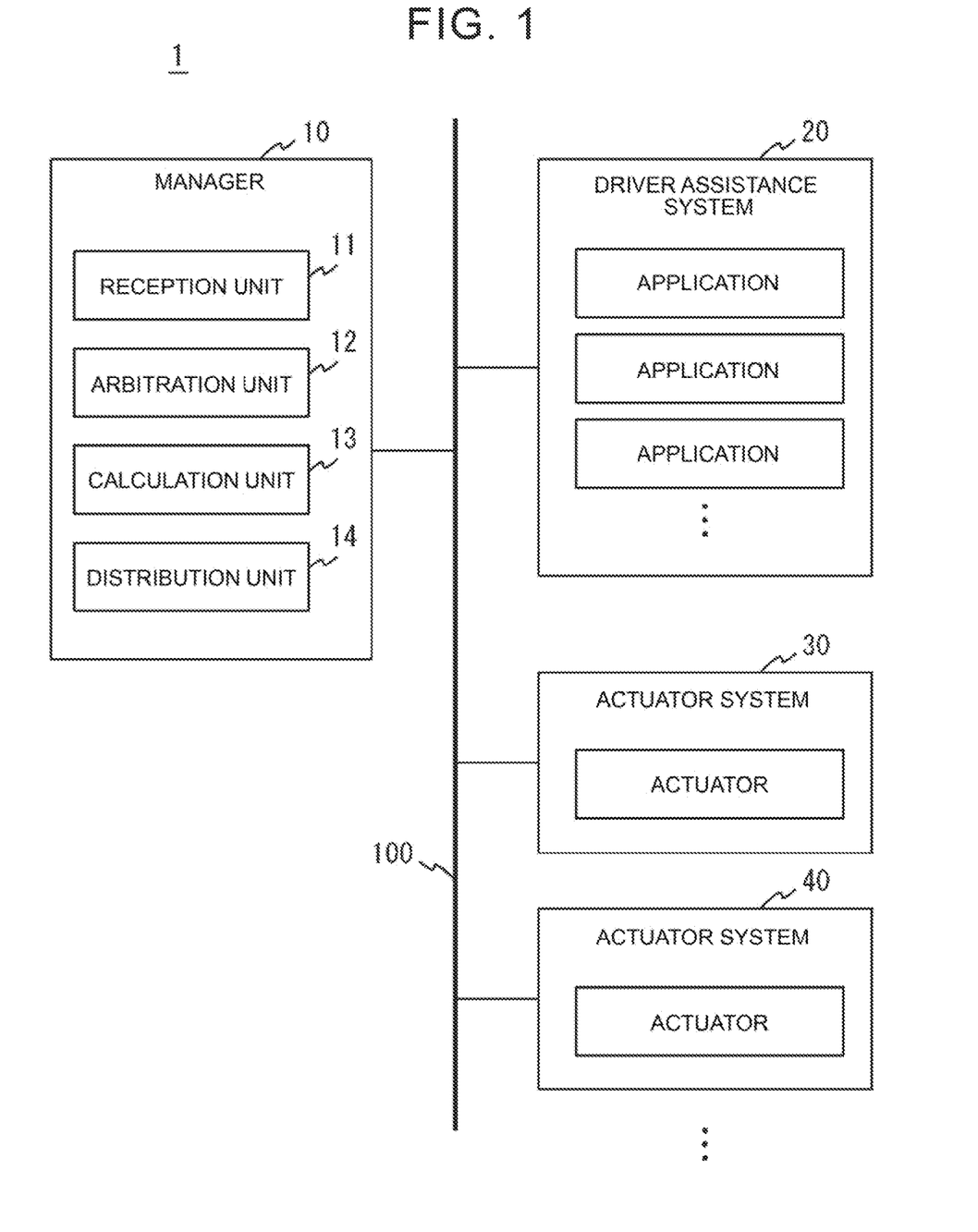
FIG. 1 is a schematic diagram illustrating a configuration example of a system according to an embodiment of the present disclosure.

FIG. 1 is a schematic diagram illustrating a configuration example of a system 1 installed in a vehicle according to the embodiment of the present disclosure. The system 1 illustrated in FIG. 1 includes a manager 10, a driver assistance system 20, and a plurality of actuator systems 30 and 40. The components of the system 1 are communicably connected via an in-vehicle network 100. Examples of the in-vehicle network 100 include a Controller Area Network (CAN) and Ethernet (registered trademark).

The driver assistance system 20 is configured to implement various functions for assisting driving of the vehicle, including at least drive control and braking control on the vehicle, by executing installed applications. Examples of the applications installed in the driver assistance system 20 include an autonomous driving application that implements autonomous driving functions, an automatic parking application that implements automatic parking functions, and an ADAS application that implements advanced driver assistance functions. Examples of the ADAS application include applications that implement functions of collision avoidance assistance (pre-crash safety (PCS), etc.), applications that implement functions of following a preceding vehicle (adaptive cruise control (ACC), etc.) to travel while keeping a predetermined distance from the preceding vehicle, applications that implement functions of lane keeping assistance (lane keeping assist (LKA), lane tracing assist (LTA), etc.) for keeping a traveling lane, applications that implement functions of collision damage reducing braking (automated emergency braking (AEB), etc.) for automatically applying a brake to reduce damage in a collision, and applications that implement functions of lane deviation warning (lane departure warning (LDW), lane departure alert (LDA), etc.) for warning a driver about deviation from a traveling lane of the vehicle.

Each application of the driver assistance system 20 outputs a request for a kinematic plan guaranteeing functionality (merchantability) of the application alone to the manager 10, as an application request, based on vehicle information (recognition sensor information, etc.) acquired (input) from various sensors and so forth (not illustrated). This kinematic plan includes a request related to a longitudinal acceleration or deceleration to be generated in the vehicle, and so forth. Each application of the driver assistance system 20 can also output identification information (application ID), which can uniquely identify its own application, to the manager 10 together with the kinematic plan. The application ID is uniquely set in advance for each application.

Each application of the driver assistance system 20 outputs, to the manager 10, information indicating that generation of a currently requested kinematic plan is scheduled to terminate. For example, a flag can be used for this information, and the manager 10 can be notified in advance about the termination of generation of the kinematic plan by turning ON the flag in a predetermined period until the generation of the kinematic plan is terminated. The kinematic plan of which generation is scheduled to terminate may be a kinematic plan with low priority. Therefore, the flag attached to this kinematic plan is hereinafter referred to as "low priority flag". For example, when an ACC application that outputs an acceleration as a kinematic plan performs a degeneration process for causing a requested acceleration to approach a lower limit value of a driving force that can be generated from the actuator systems 30 and 40 to terminate the request in the future, the ACC application can turn ON the low priority flag and output the flag to the manager 10 during a period from a time immediately after the start of the degeneration process to a time of the stop of the acceleration request.

The driver assistance system 20 is implemented by a computer such as an electronic control unit (ECU) including a processor such as a central processing unit (CPU), a memory, and an input/output interface (output unit). The number of ECUs constituting the driver assistance system 20 and the number of applications installed in the ECUs are not particularly limited. A separate ECU may be provided for each application in the driver assistance system 20. For example, the driver assistance system 20 may be constituted by an autonomous driving ECU in which the autonomous driving application is installed, an automatic parking ECU in which the automatic parking application is installed, and an ADAS-ECU in which the advanced driver assistance application is installed. A plurality of ADAS applications may be installed in a plurality of ECUs, such as an ECU in which an ADAS application that implements an ACC function is installed, an ECU in which an ADAS application that implements an LKA function is installed, and an ECU in which an ADAS application that implements an AEB function is installed.

The actuator systems 30 and 40 are components of a realization system for realizing requests for kinematic plans that are output by the driver assistance system 20. For example, the actuator system 30 is a powertrain system including a powertrain actuator (engine, transmission, etc.) capable of generating a braking/driving force in the vehicle and configured to control operations of the powertrain actuator, thereby realizing requests for kinematic plans. For example, the actuator system 40 is a brake system including a brake actuator (hydraulic brakes, electronic parking brakes, etc.) capable of generating a braking force in the vehicle and configured to control operations of the brake actuator, thereby realizing requests for kinematic plans. The number of actuator systems mounted on the vehicle is not particularly limited.

The manager 10 determines control contents related to motion of the vehicle based on kinematic plan requests received from the driver assistance system 20, and outputs requests to the actuator system 30 and/or the actuator system 40 based on the determined control contents as necessary. The manager 10 distributes a motion request to the actuator system 30 and/or the actuator system 40 based on the low priority flag acquired from the driver assistance system 20 together with the kinematic plan request.

The manager 10 controls the motion of the vehicle by functioning as an ADAS manager (MGR) or a vehicle MGR involved in so-called vehicle motion or as a part of the ADAS MGR or the vehicle MGR. The manager 10 includes a reception unit 11, an arbitration unit 12, a calculation unit 13, and a distribution unit 14.

The reception unit 11 receives kinematic plan requests and low priority flags output by a plurality of applications of the driver assistance system 20. Examples of the kinematic plans in the present embodiment include an acceleration related to a motion in a fore-and-aft direction (longitudinal direction) of the vehicle. The reception unit 11 receives a generable driving force lower limit (availability lower limit) from the actuator system 30 including the powertrain actuator. The driving force lower limit is a lower limit value (minimum driving force) of the driving force that can be realized by the powertrain actuator with an accelerator in a fully closed state in which an accelerator pedal is undepressed at a current gear ratio (gear stage). The kinematic plan requests, the low priority flags, and the driving force lower limit received by the reception unit 11 are output to the arbitration unit 12.

The arbitration unit 12 arbitrates the kinematic plan requests received from the applications of the driver assistance system 20 by the reception unit 11. Examples of a process of this arbitration include a process in which one kinematic plan is selected from the kinematic plans based on a predetermined selection criterion (for example, minimum selection). As another arbitration process, a new kinematic plan may be set based on the kinematic plans. At this time, the arbitration unit 12 arbitrates the kinematic plan requests based on the low priority flags received from the applications by the reception unit 11 and the generable driving force lower limit acquired from the actuator system 30 by the manager 10. This arbitration will be described later.

The kinematic plans received from the applications by the reception unit 11 may have preset priority levels related to the arbitration. To arbitrate the kinematic plans, the arbitration unit 12 may arbitrate a plurality of kinematic plans by applying the low priority flag prior to the priority levels, or may arbitrate a plurality of kinematic plans after temporarily changing the priority levels based on the low priority flag.

The calculation unit 13 calculates a motion request based on a result of arbitration of the kinematic plan requests at the arbitration unit 12. This motion request is a physical quantity for controlling the actuator system 30 and/or the actuator system 40, and is different from the physical quantity of the kinematic plan request. For example, when the kinematic plan request is an acceleration, a driving force and a driving torque can be calculated as the motion request. Thus, the request for the acceleration is converted into a request for the driving force and the driving torque.

The calculation unit 13 can perform a predetermined restriction process for the calculated motion request based on the low priority flags received from the applications and the generable driving force lower limit acquired from the actuator system 30 by the manager 10. This restriction process will be described later.

The distribution unit 14 distributes the motion request calculated by the calculation unit 13 or the motion request subjected to the restriction process after the calculation to at least one of the actuator systems 30 and 40. For example, when the brakes are not used, the distribution unit 14 distributes the motion request only to the actuator system 30 including the powertrain actuator. For example, when the engine and the brakes are used together, the distribution unit 14 appropriately distributes the motion request to the actuator system 30 including the powertrain actuator and the actuator system 40 including the brake actuator.

The components of the manager 10, the driver assistance system 20, and the actuator systems 30 and 40 mounted on the vehicle are exemplary, and may be added, replaced, changed, or omitted as appropriate. The functions of each device can be implemented by integration of the functions into one device or distribution of the functions between or among a plurality of devices as appropriate.

Control

Control to be executed by the manager 10 according to the present embodiment will be described with further reference to FIGS. 2 to 7.

(1) Arbitration/Calculation Process

Figure 2:
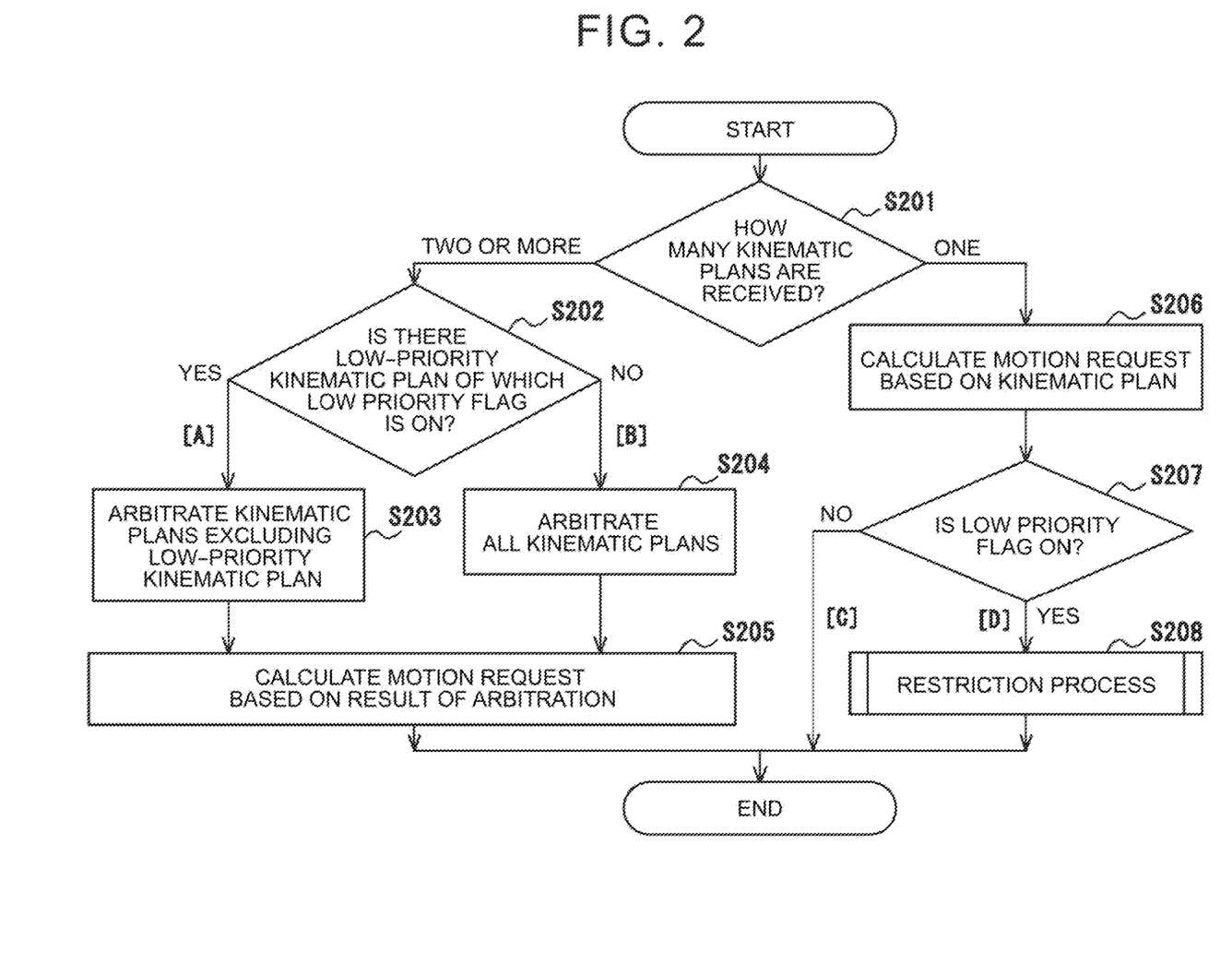
FIG. 2 is a flowchart illustrating a procedure of an arbitration process to be executed by a manager.

FIG. 2 is a flowchart illustrating a procedure of an arbitration/calculation process to be executed by the arbitration unit 12 and the calculation unit 13 of the manager 10. The arbitration/calculation process illustrated in FIG. 2 is started when the reception unit 11 of the manager 10 receives kinematic plan requests from the applications of the driver assistance system 20. Examples of the kinematic plan include an acceleration.

Step S201

The arbitration unit 12 checks the number of kinematic plans received from the applications by the reception unit 11. When there are two or more kinematic plans (Step S201: Two or more), the process proceeds to Step S202. When there is only one kinematic plan (Step S201: One), the process proceeds to Step S206.

Step S202

The arbitration unit 12 determines whether there is a kinematic plan of which low priority flag is ON among the two or more kinematic plans received from the applications by the reception unit 11. That is, the arbitration unit 12 determines whether the kinematic plans requested by the applications include a low-priority kinematic plan that is about to terminate its output while being degenerated. The kinematic plan of which low priority flag is ON is hereinafter referred to as "low-priority kinematic plan". When there are one or more low-priority kinematic plans of which low priority flags are ON (Step S202: Yes), the process proceeds to Step S203 (Pattern [A]). When there is no low-priority kinematic plan of which low priority flag is ON (Step S202: No), the process proceeds to Step S204 (Pattern [B]).

Step S203

The arbitration unit 12 excludes the low-priority kinematic plan of which low priority flag is ON from the two or more kinematic plans received from the applications by the reception unit 11, and arbitrates the remaining kinematic plans excluding this low-priority kinematic plan. Examples of the arbitration process include a process of adopting a kinematic plan that requests a minimum value among the kinematic plans to be arbitrated. When the kinematic plans are arbitrated, the process proceeds to Step S205.

Step S204

The arbitration unit 12 arbitrates all the kinematic plans received from the applications by the reception unit 11. Examples of the arbitration process include a process of adopting a kinematic plan that requests a minimum value of all the kinematic plans. When the kinematic plans are arbitrated, the process proceeds to Step S205.

Step S205

The calculation unit 13 calculates a motion request based on a result of the arbitration at the arbitration unit 12. Examples of the motion request include a driving force. This calculated motion request is output to the distribution unit 14 of the manager 10 as a motion request to be distributed to at least one of the actuator systems 30 and 40. When the motion request is calculated, the arbitration/calculation process is terminated.

Step S206

The calculation unit 13 calculates a motion request based on the one kinematic plan received from the application by the reception unit 11. This one kinematic plan is a kinematic plan adopted as a result of arbitration by the arbitration unit 12. Examples of the motion request include a driving force. When the motion request is calculated, the process proceeds to Step S207.

Step S207

The calculation unit 13 determines whether the low priority flag of the one kinematic plan for which the motion request is calculated is ON. That is, the calculation unit 13 determines whether the request for the one kinematic plan is about to terminate while being degenerated. When the low priority flag of the one kinematic plan is OFF (Step S207: No), the motion request calculated in Step S206 is output to the distribution unit 14 as a motion request to be distributed to at least one of the actuator systems 30 and 40, and the arbitration/calculation process is terminated (Pattern [C]). When the low priority flag of the one kinematic plan is ON (Step S207: Yes), the process proceeds to Step S208 (Pattern [D]).

Step S208

The calculation unit 13 performs the predetermined restriction process for the motion request calculated in Step S206. This restriction process will be described later. A new motion request obtained by performing the restriction process for the motion request calculated in Step S206 is output to the distribution unit 14 as a motion request to be distributed to at least one of the actuator systems 30 and 40, and the arbitration/calculation process is terminated.

In this way, when the low-priority kinematic plan for which the request is scheduled to terminate is present among the kinematic plans received from the applications, the low-priority kinematic plan is excluded from the target of arbitration. As a result, the kinematic plans other than the low-priority kinematic plan are adopted, thereby reducing the occurrence of slowness in control.

The embodiment described above is directed to the example in which the arbitration unit 12 and the calculation unit 13 determine whether the low priority flag of the kinematic plan is ON. This determination may be made by another component (for example, a flag determination unit), and the determination result may be output to the arbitration unit 12 and the calculation unit 13.

The arbitration/calculation process to be executed by the manager 10 will specifically be described with reference to FIGS. 3 and 4. This specific example is directed to a case where accelerations in the fore-and-aft direction are requested as kinematic plans from the applications of the driver assistance system 20 and a minimum acceleration is adopted from the accelerations in the arbitration process (minimum selection).

Figure 3:
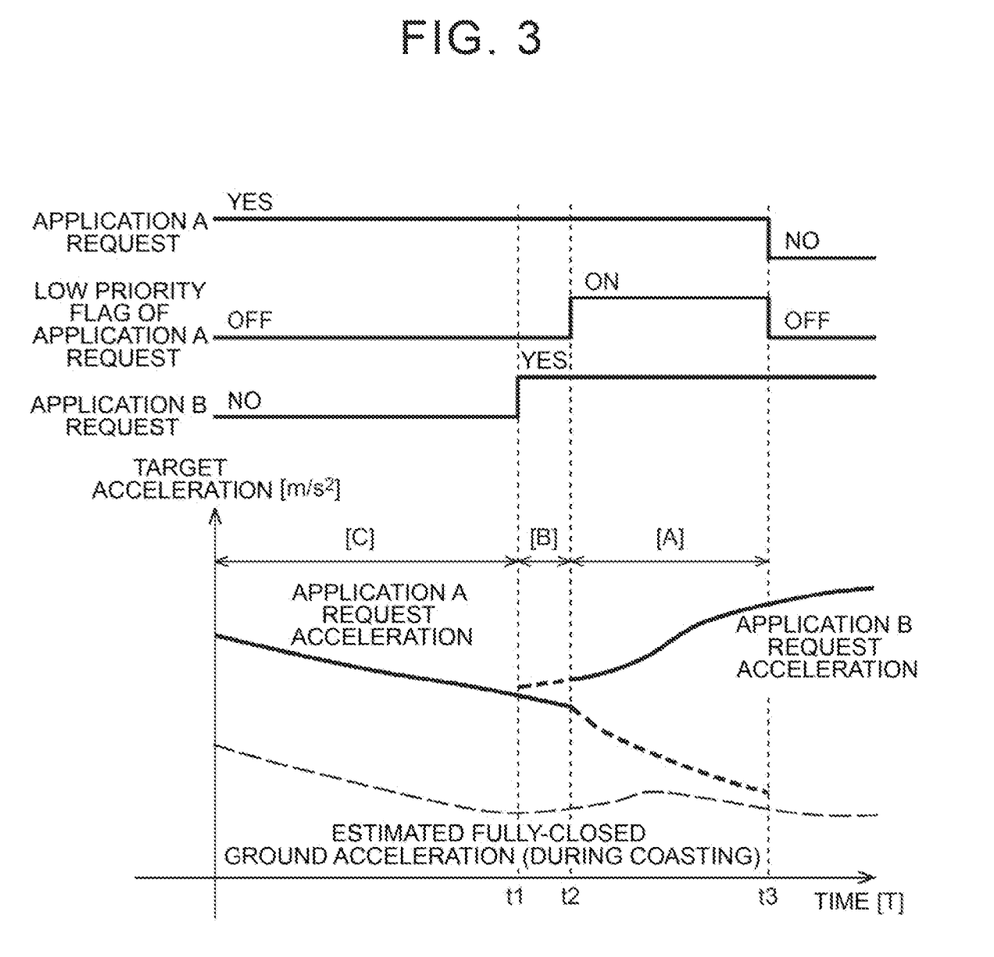
FIG. 3 is a diagram illustrating an example of the arbitration process for a plurality of requested accelerations (kinematic plans)

FIG. 3 illustrates an example in which both a kinematic plan requested from an application A (hereinafter referred to as "application A request") and a kinematic plan requested from an application B (hereinafter referred to as "application B request") are made and the low priority flag of the application A request is turned ON.

In a period corresponding to time T<t1 in which only the application A request is present, the acceleration requested by the kinematic plan of the application A (hereinafter referred to as "application A request acceleration") is adopted by arbitration (Pattern [C] in FIG. 2).

In a period corresponding to time t1≤T<t2 within a period corresponding to time t1≤T<t3 in which the application A request and the application B request are in conflict and arbitration is performed, the low priority flag of the application A request is still OFF. Therefore, the application A request acceleration that is the minimum value is adopted by arbitration (Pattern [B] in FIG. 2).

In a period corresponding to time t2≤T<3 within the period corresponding to time t1≤T<t3 in which the application A request and the application B request are in conflict and arbitration is performed, the low priority flag of the application A request is turned ON and the application A request acceleration is excluded from the target of arbitration. Therefore, the acceleration requested by the kinematic plan of the application B (hereinafter referred to as "application B request acceleration") is adopted by arbitration (Pattern [A] in FIG. 2).

In a period corresponding to time t3≤T in which the application A request is terminated and only the application B request is present, the application B request acceleration is adopted by arbitration.

Figure 4:
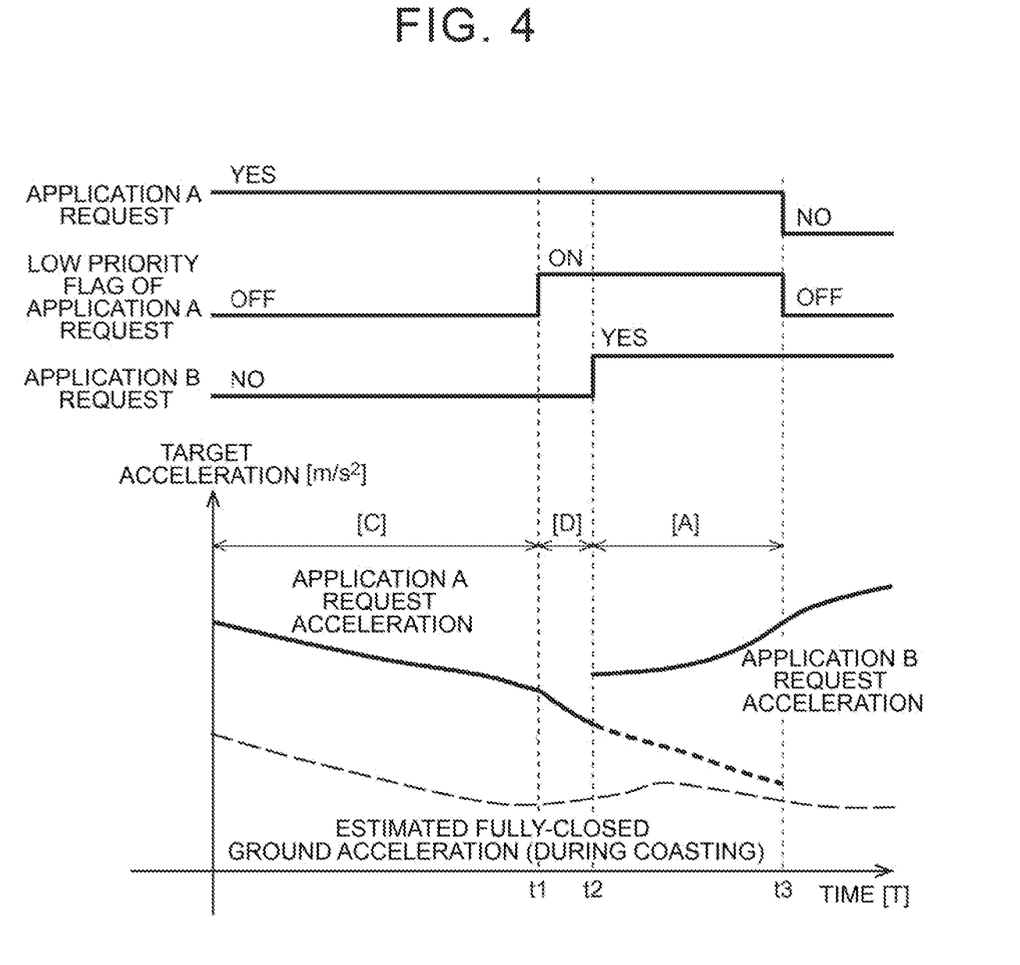
FIG. 4 is a diagram illustrating an example of the arbitration process for the requested accelerations (kinematic plans)

FIG. 4 illustrates an example in which the low priority flag of the application A request that has already been made is ON before the application B request is made.

In a period corresponding to time T<t1 within a period corresponding to time T<t2 in which only the application A request is present, the application A request acceleration is adopted by arbitration (Pattern [C] in FIG. 2).

In a period corresponding to time t1≤T<t2 within the period corresponding to time T<t2 in which only the application A request is present, the application A request acceleration is adopted by arbitration as in the period corresponding to time T<t1, but the restriction process described later is performed for the driving force (motion request) calculated based on the application A request acceleration because the low priority flag of the application A request is ON (Pattern [D] in FIG. 2).

In a period corresponding to time t2≤T<t3 in which the application A request and the application B request are in conflict and arbitration is performed, the application A request acceleration is excluded from the target of arbitration because the low priority flag of the application A request is ON, and the application B request acceleration is adopted by arbitration (Pattern [A] in FIG. 2).

In a period corresponding to time t3≤T in which only the application B request is present, the application B request acceleration is adopted by arbitration.

When the plurality of requests from the applications is in conflict as in the example described above, the request from the application of which low priority flag is ON is excluded from the target of arbitration. Therefore, it is possible to avoid, for example, a case where the kinematic plan of the application that requests an extremely low acceleration by the degeneration process is adopted by arbitration, thereby reducing the occurrence of slowness in control.

(2) Restriction Process

Figure 5:
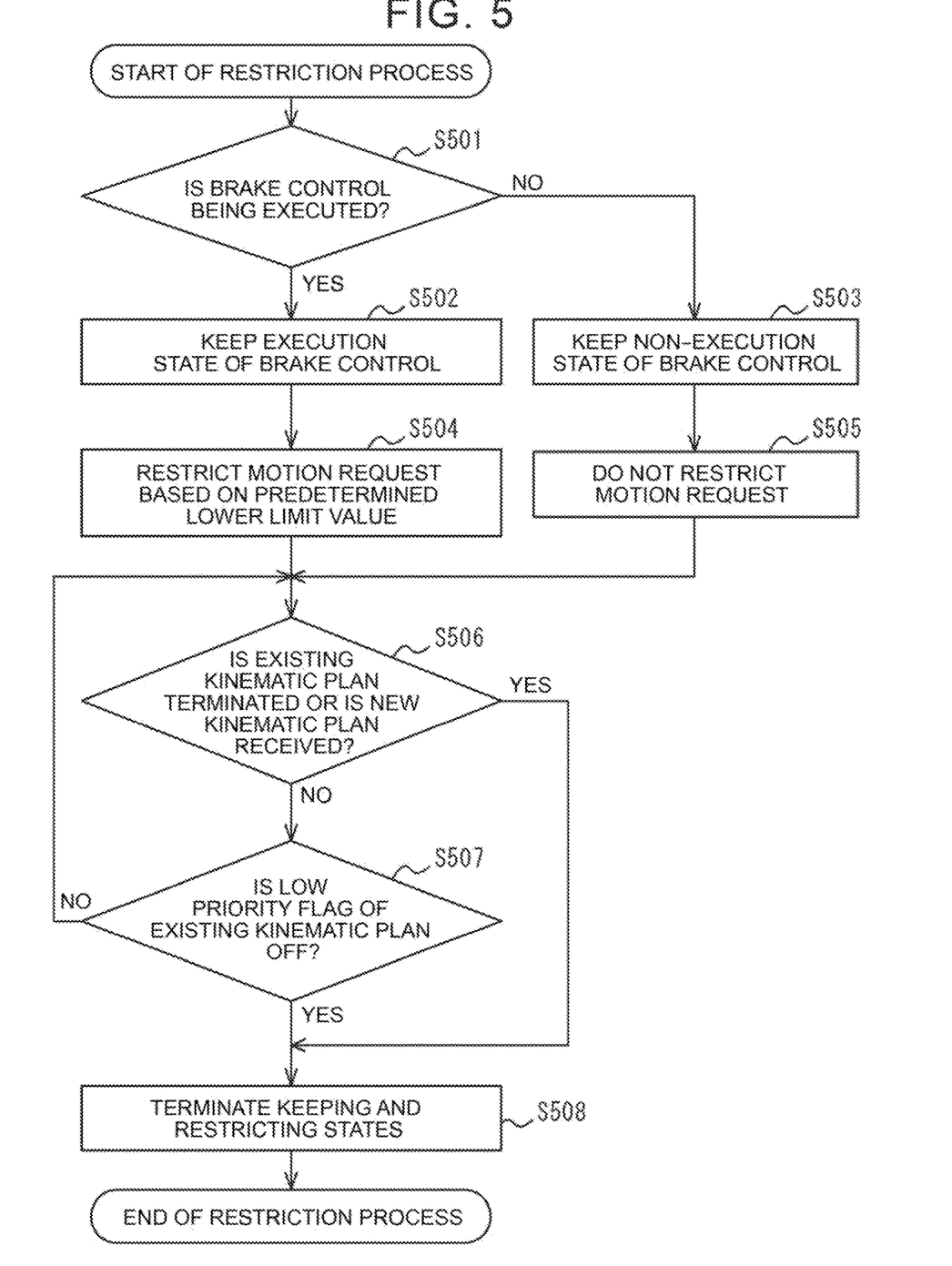
FIG. 5 is a flowchart illustrating a procedure of a restriction process to be executed by the manager.

Next, the restriction process (Step S208 in FIG. 2) to be performed for the motion request by the calculation unit 13 of the manager 10 in the arbitration/calculation process will be described with reference to FIG. 5. FIG. 5 is a flowchart illustrating a procedure of the restriction process to be executed by the manager 10.

Step S501

The manager 10 determines whether the vehicle is executing brake control. Whether the brake control is being executed can be determined by whether the actuator system 40 is operating the brake actuator. When the brake control is being executed (Step S501: Yes), the process proceeds to Step S502. When the brake control is not being executed (Step S501: No), the process proceeds to Step S503.

Step S502

The manager 10 keeps the execution state of the brake control. That is, the distribution unit 14 of the manager 10 appropriately distributes the motion request to the actuator system 40 to continuously execute the brake control by the brake actuator. When the execution state of the brake control is kept, the process proceeds to Step S504.

Step S503

The manager 10 keeps the non-execution state of the brake control. That is, the distribution unit 14 of the manager 10 restricts (or prohibits) the distribution of the motion request to the actuator system 40 so that the brake control by the brake actuator does not newly occur. When the non-execution state of the brake control is kept, the process proceeds to Step S505.

Step S504

The calculation unit 13 of the manager 10 restricts, based on a predetermined lower limit value, the motion request calculated based on the result of arbitration of the kinematic plan. When the motion request is a driving force, this predetermined lower limit value may be a lower limit value of the driving force (driving force lower limit) that can be realized by the powertrain actuator at a current gear ratio. The manager 10 can acquire the driving force lower limit by inputting feedback from the actuator system 30 including the powertrain actuator. The motion request restricted based on the driving force lower limit is distributed to the actuator system 30 and/or the actuator system 40 by the distribution unit 14. When the motion request is restricted based on the driving force lower limit, the process proceeds to Step S506.

Step S505

The calculation unit 13 of the manager 10 does not restrict the motion request calculated based on the result of arbitration of the kinematic plan. That is, the unrestricted motion request is distributed to the actuator system 30 and/or the actuator system 40 by the distribution unit 14. Subsequently, the process proceeds to Step S506.

Step S506

The manager 10 determines whether the existing kinematic plan request received from the application by the reception unit 11 is terminated, or whether the reception unit 11 receives a new kinematic plan request from another application. When the existing kinematic plan request is terminated or there is a new kinematic plan request (Step S506: Yes), the process proceeds to Step S508. When the existing kinematic plan request is not terminated and there is no new kinematic plan request (Step S506: No), the process proceeds to Step S507.

Step S507

The manager 10 determines whether the low priority flag of the existing kinematic plan request received from the application by the reception unit 11 is turned OFF. When the low priority flag of the existing kinematic plan request is turned OFF (Step S507: Yes), the process proceeds to Step S508. When the low priority flag of the existing kinematic plan request remains ON (Step S507: No), the process proceeds to Step S506.

Step S508

The manager 10 terminates the keeping state for the brake control in Step S502 or S503 and the restricting state for the motion request in Step S504. When the keeping and restricting states are terminated, the restriction process is terminated.

In this way, when only one kinematic plan is received from the application and this kinematic plan is the low-priority kinematic plan for which the request is about to terminate through degeneration, the motion request calculated based on the kinematic plan is restricted to the predetermined lower limit value. By restricting the motion request that is, for example, the driving force to the lower limit value of the driving force (driving force lower limit) that can be generated by the powertrain actuator, the requested driving force does not change across the driving force lower limit. Thus, it is possible to reduce a phenomenon in which the operating and non-operating states of the brake actuator are frequently switched to deteriorate the riding comfort of the vehicle.

Next, the restriction process to be executed by the manager 10 will specifically be described with reference to FIGS. 6 and 7. This specific example is directed to a case where the driving force is calculated as the motion request by the calculation unit 13 of the manager 10.

Figure 6:
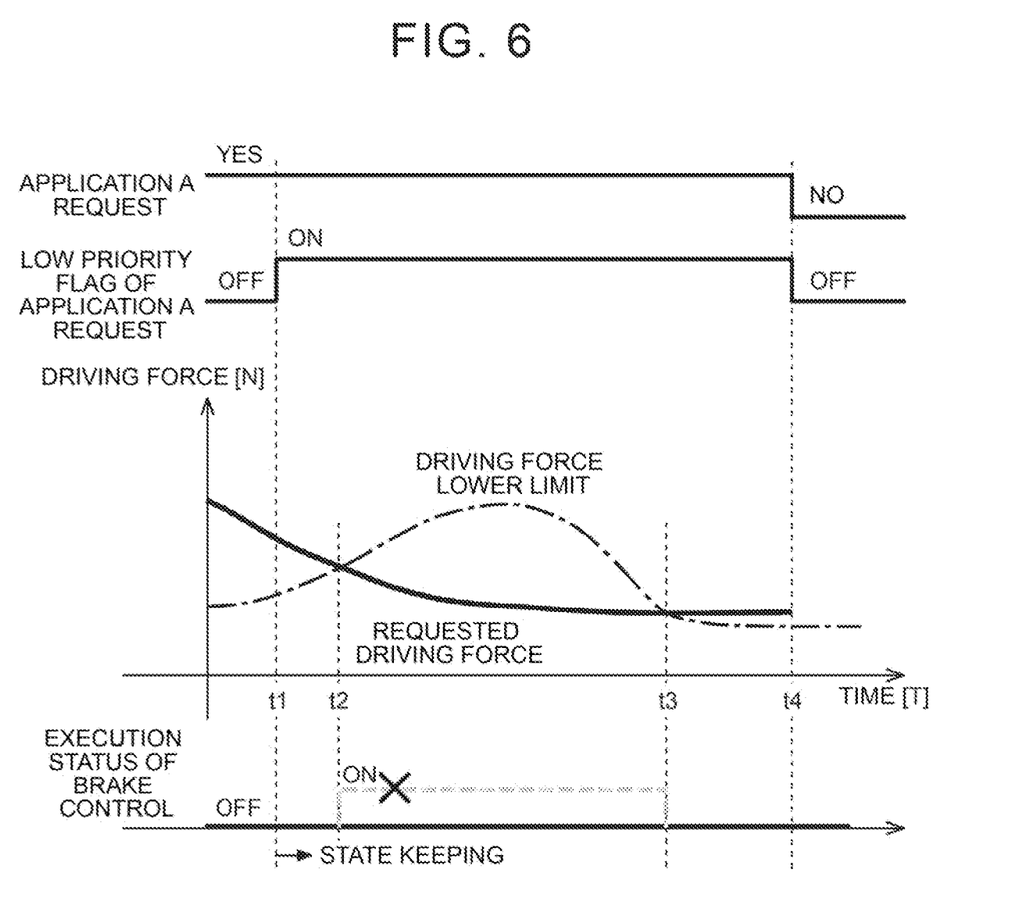
FIG. 6 is a diagram illustrating an example of the restriction process for a driving force (motion request)

FIG. 6 illustrates an example in which the low priority flag of a kinematic plan requested from the application A (hereinafter referred to as "application A request") is turned ON while the brake control by the brake actuator is not being executed (unexecuted).

In the example of FIG. 6, the brake control by the brake actuator is not being executed at the time when the low priority flag is turned ON (time t1). Therefore, the non-execution state of the brake control is kept. Even if the requested driving force (continuous line) then falls below the driving force lower limit of the powertrain actuator (long dashed short dashed line) (time t2≤T≤t3), the brake control is not executed (the brake actuator does not operate). That is, a driving force as requested (as expected) from the application A is distributed to the powertrain actuator until the time when the application A request is terminated or the low priority flag is turned OFF (time t4).

Figure 7:
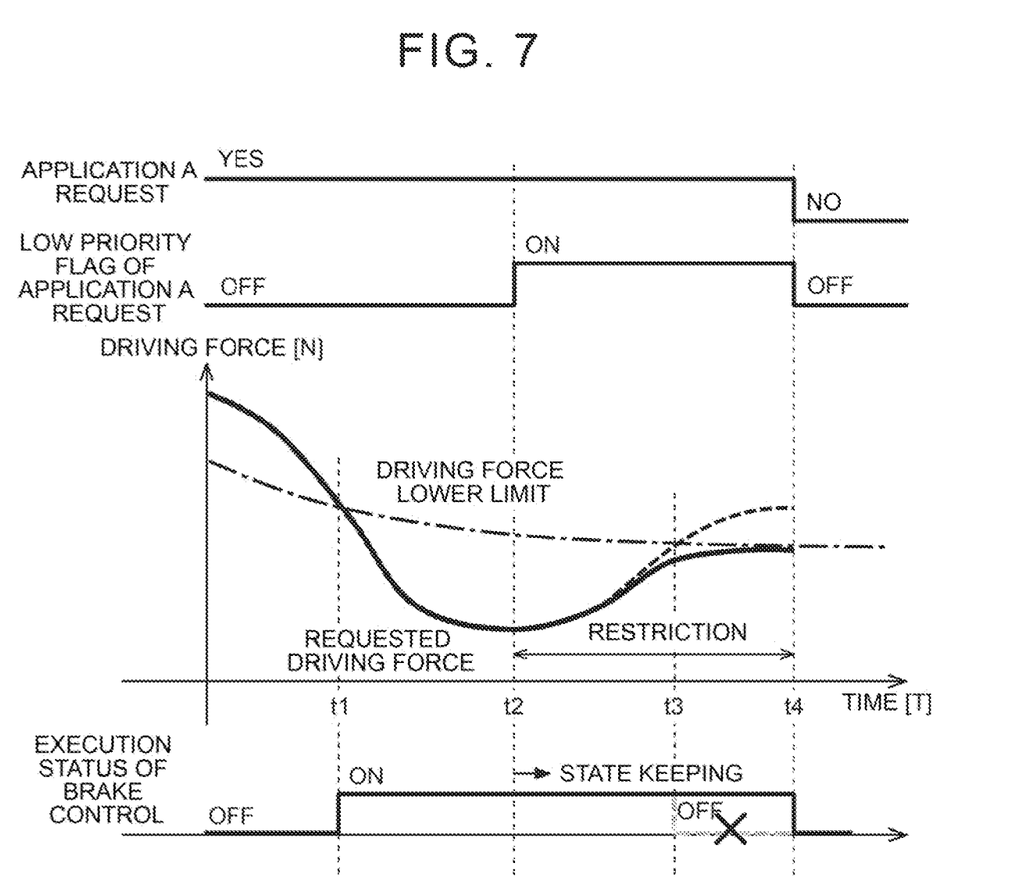
FIG. 7 is a diagram illustrating another example of the restriction process for the driving force (motion request).

FIG. 7 illustrates an example in which the low priority flag of the application A request is turned ON while the brake control by the brake actuator is being executed.

In the example of FIG. 7, the brake control is executed when the driving force of the application A request (continuous line) falls below the driving force lower limit of the powertrain actuator (long dashed short dashed line) (time t1). When the low priority flag is then turned ON (time t2), the execution state of the brake control is kept. The requested driving force is restricted so as not to exceed the driving force lower limit. Through this restriction, the driving force is appropriately distributed to the brake actuator and the powertrain actuator to continue the execution of the brake control even if a driving force exceeding the driving force lower limit (dashed line) is requested by the application A request. Therefore, the brake control being executed does not stop (the brake actuator is not switched to nonoperation) until the application A request is terminated or the low priority flag is turned OFF (time t4).

Operations and Effects

As described above, in the system according to the embodiment of the present disclosure, when a plurality of kinematic plan requests is made from the applications in conflict and a plurality of kinematic plans includes a kinematic plan for which the request is scheduled to terminate (low-priority kinematic plan), arbitration is performed while excluding the kinematic plan scheduled to terminate. This makes it easier to adopt a kinematic plan other than the kinematic plan scheduled to terminate (for example, the kinematic plan of the application that requests an extremely low acceleration by the degeneration process). Therefore, it is possible to avoid a case where no other kinematic plan request is adopted until termination of the kinematic plan request scheduled to terminate, thereby reducing the occurrence of slowness in control.

In the system according to the present embodiment, when only one kinematic plan is received from the application and the one kinematic plan is the low-priority kinematic plan, the motion request calculated based on the low-priority kinematic plan is restricted to the predetermined lower limit value. By restricting the motion request that is, for example, the driving force to the driving force lower limit that can be generated by the powertrain actuator, the motion request does not change across the lower limit value. Thus, it is possible to reduce a phenomenon in which the operating and non-operating states of the brake actuator are frequently switched to deteriorate the riding comfort of the vehicle.

Although the embodiment of the technology according to the present disclosure has been described above, the present disclosure is not limited to the manager mounted on the vehicle, and can be understood as an electronic control unit, a system including an electronic control unit and a manager, a control method to be executed by a manager including a processor and memory, a control program, a non-transitory computer-readable storage medium storing the control program, a vehicle including a manager, and so forth.

The present disclosure is useful in, for example, a manager to be mounted on a vehicle.

What is claimed is:

1. A vehicle comprising:
one or more electronic control units that implement a plurality of different advanced driver assistance system (ADAS) applications;
a plurality of actuator systems configured to cause motion of the vehicle in at least one of a front-rear direction of the vehicle and a lateral direction of the vehicle; and
a control apparatus mounted on the vehicle and coupled to the one or more electronic control units and to the plurality of actuator systems, the control apparatus comprising one or more processors configured to:
receive a kinematic plan from each of the plurality of ADAS applications, each of the kinematic plans having a priority level;
perform arbitration of the kinematic plans when a plurality of the kinematic plans are received simultaneously from the ADAS applications, the arbitration using the priority levels of the kinematic plans that are being arbitrated;
calculate a motion request based on an arbitration result of the arbitration that is performed; and
output the motion request to at least one of the plurality of actuator systems; wherein
when at least one kinematic plan of the plurality of kinematic plans that have been received simultaneously from the ADAS applications also includes, in addition to the priority level, termination information indicating that the at least one kinematic plan is being subjected to a degeneration process prior to termination of the at least one kinematic plan, the control apparatus excludes the at least one kinematic plan from the arbitration while the at least one kinematic plan is being subjected to the degeneration process, and
the one or more actuator systems control the vehicle according to the motion request that has been output.

2. The control apparatus according to claim 1, wherein the degeneration process is a restriction process in which the at least one kinematic plan is reduced toward a driving force lower limit that is generable by the at least one actuator system.

3. The control apparatus according to claim 2, wherein:
the driving force lower limit is a lower limit of a driving force realizable by a powertrain actuator at a current gear ratio; and
the at least one actuator system includes a powertrain system including the powertrain actuator.

4. The control apparatus according to claim 1, wherein the one or more processors are configured to:
when only a single kinematic plan has been received from amongst the plurality of ADAS applications, and the single kinematic plan includes, in addition to the priority level, the termination information indicating that the single kinematic plan is being subjected to the degeneration process prior to termination of the single kinematic plan, restrict, based on a driving force lower limit generable by the at least one actuator system that is controlled based on a motion request calculated from the single kinematic plan depending on an execution status of brake control.

5. The control apparatus according to claim 4, wherein the one or more processors are configured to restrict the motion request calculated from the single kinematic plan based on the driving force lower limit generable by the at least one actuator system when the brake control is being executed.

6. A vehicle comprising:
a plurality of different advanced driver assistance system (ADAS) applications installed in one or more electronic control units mounted on the vehicle;
a plurality of actuator systems configured to cause motion of the vehicle in at least one of a front-rear direction of the vehicle and a lateral direction of the vehicle; and
a manager, wherein:
the one or more electronic control units are configured to output, to the manager, a plurality of kinematic plans requested by the ADAS applications; and
the manager includes one or more processors and is configured to:
receive a kinematic plan from each of the ADAS applications, each of the kinematic plans having a priority level;
perform arbitration of the kinematic plans when a plurality of the kinematic plans are received simultaneously from the ADAS applications, the arbitration using the priority levels of the kinematic plans that are being arbitrated;
calculate a motion request based on an arbitration result of the arbitration that is performed; and
output the motion request to at least one of the plurality of actuator systems; wherein when at least one kinematic plan of the plurality of kinematic plans that have been received simultaneously from the ADAS applications also includes, in addition to the priority level, termination information indicating that the at least one kinematic plan is being subjected to a degeneration process prior to termination of the at least one kinematic plan, the control apparatus excludes the at least one kinematic plan from the arbitration while the at least one kinematic plan is being subjected to the degeneration process, and the one or more actuator systems control the vehicle according to the motion request that has been output.

7. A vehicle control method of a vehicle that includes (a) one or more electronic control units that implement a plurality of different advanced driver assistance system (ADAS) applications, (b) a plurality of actuator systems configured to cause motion of the vehicle in at least one of a front-rear direction of the vehicle and a lateral direction of the vehicle, and (c) one or more processors mounted on the vehicle and coupled to the one or more electronic control units and to the plurality of actuator systems, the control method executed by the one or more processors and comprising:

receiving, from each of the plurality of ADAS applications, a kinematic plan, each of the kinematic plans having a priority level;

performing arbitration of the received kinematic plans when a plurality of the kinematic plans are received simultaneously from the ADAS applications, the arbitration using the priority levels of the kinematic plans that are being arbitrated;

calculating a motion request based on a result of the arbitration that is performed; and outputting the motion request to at least one of the plurality of actuator systems, wherein when at least one kinematic plan of the plurality of kinematic plans that have been received simultaneously from the ADAS applications also includes, in addition to the priority level, termination information indicating that the at least one kinematic plan is being subjected to a degeneration process prior to termination of the at least one kinematic plan, excluding the at least one kinematic plan from the arbitration while the at least one kinematic plan is being subjected to the degeneration process, and the one or more actuator systems controlling the vehicle according to the motion request that has been output.

* * * * *